United States Patent [19]

Stouffer

[11] 4,428,277
[45] Jan. 31, 1984

[54] OSCILLATING REED AND METHOD

[75] Inventor: Ronald D. Stouffer, Silver Spring, Md.

[73] Assignee: Bowles Fluidics Corporation, Silver Spring, Md.

[21] Appl. No.: 302,285

[22] Filed: Sep. 14, 1981

Related U.S. Application Data

[62] Division of Ser. No. 119,699, Feb. 8, 1980, Pat. No. 4,336,909.

[51] Int. Cl.³ .............................................. B60H 1/24
[52] U.S. Cl. ........................................ 98/2; 98/2.08; 98/2.09; 239/381
[58] Field of Search ................. 98/2, 2.01, 2.04, 2.08, 98/2.09; 137/826, 829, 831; 239/102, 380, 381, 382, 389, 516, 517

[56] References Cited

U.S. PATENT DOCUMENTS 3,342,198 9/1967 Groeber .............................. 137/829
3,408,050 10/1968 Jacobs ............................. 239/102 X
3,687,369 8/1972 Johnstone ........................... 239/102

FOREIGN PATENT DOCUMENTS 303092 6/1971 U.S.S.R. .............................. 239/102

Primary Examiner—Edward G. Favors
Assistant Examiner—Harold Joyce
Attorney, Agent, or Firm—Jim Zegeer

[57] ABSTRACT

There is disclosed an oscillating reed particularly for use in generating a sweeping or oscillating air flow pattern which is rendered clickless by limiting directions of bending of the reed element to an axis transverse to the direction of air flow. This significantly silences the oscillations and, in conjunction with polishing of the edges of the reed and rounding the corners of the mounting bar in which the downstream end of the reed is secured, cracking and breakage of the reed element has been substantially eliminated thereby lengthening significantly the life of the oscillating element.

2 Claims, 4 Drawing Figures

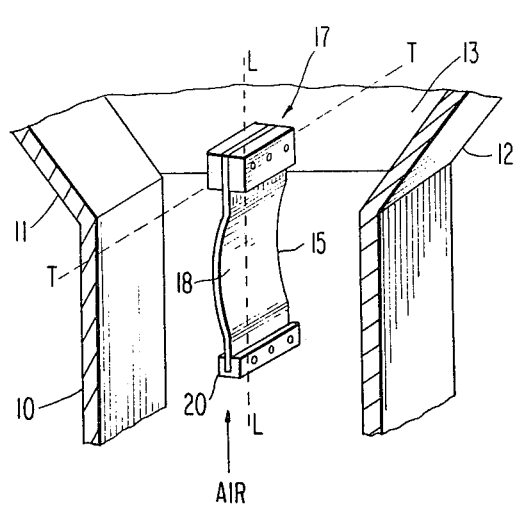
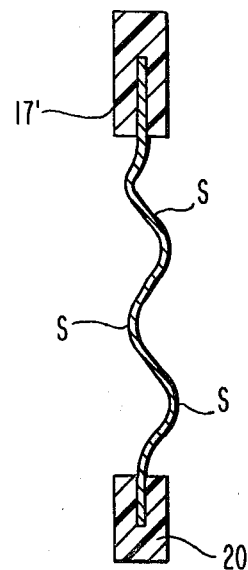
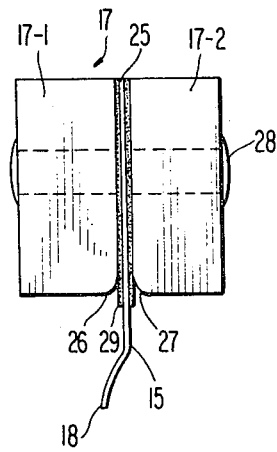
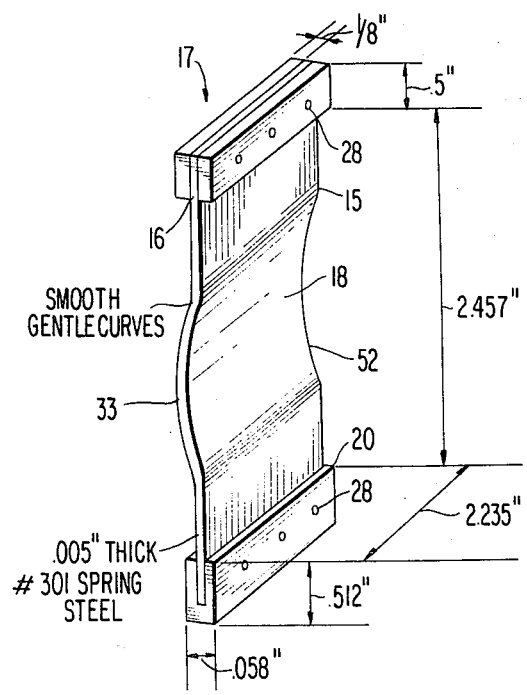

OSCILLATING REED AND METHOD

This application is a division of my application Ser. No. 119,699 filed Feb. 8, 1980 now U.S. Pat. No. 4,336,909.

REFERENCE TO RELATED APPLICATIONS

This application is an improvement of the oscillating reed structure shown in my patent application Ser. No. 030,794 filed Apr. 17, 1979 now U.S. Pat. No. 4,250,799 entitled "SWEEPING AIR STREAM APPARATUS AND METHOD" which is incorporated herein by reference.

BACKGROUND AND BRIEF SUMMARY OF THE INVENTION

In my application Ser. No. 030,794 filed Apr. 17, 1979 Now U.S. Pat. No. 4,250,799 entitled "SWEEPING AIR STREAM APPARATUS AND METHOD" I disclose a resilient vane or reed oscillator which is rendered oscillatable between a pair of extreme positions soley by air flow to cause the air to issue from the device in a sweeping air stream or fan shaped pattern. In that device, the upstream end of the reed or vane had attached or formed thereon a weight element and the downstream was secured in a fixed relation so that the air passing through the duct impinged on the weighted upstream end of the thin metal reed to initiate and sustain ocillation of the reed back and forth in the air stream. The reed is fairly broad and wide and acts like a moving wall to deflect or direct the exiting air jet stream in a sweeping fashion. Since the upstream end of the reed is unsupported and is required that during its any direction or its travel that it does not contact any structure, the fluid air streams can and do at times distort the bending axis of the reed and thereby creating a clicking sound much in the fashion of the cricket noise makers used at parties, Halloween and New Year times. However, such noise making is very undesirable and because of the distortion in the spring metal itself tends to greatly reduce the life of the element when used as an oscillator. The objects of the present invention are to provide improved oscillating reed structures which are essentially clickless or noiseless and have long operating lifes.

These objects and the advantages of the invention are achieved by providing a transverse stiffening of the reed element in directions transverse to the direction of air flow so as to limit bending of the reed element during its oscillations along a axis which is transverse to the direction of air flow. That is to say, the axis of stiffening is parallel to the bending axis but it does not detract from the flexibility and oscillating function of the device. In a preferred embodiment, the bending is a gentle curvature or bending or the reed element over substantially the entire body. In addition, the body of the reed support element has a slot in it with the mouth of the slot gently rounded or smoothed to receive and clamp the downstream end of the reed element so that there are no sharp edges against which the body of the reed element is engaged during oscillation. Moreover the edges of the reed element is polished to remove notches etc ... all of these features avoiding metal fatigue of the reed body leading to extended life of the oscillator element per se.

The above and other objects advantages and features of the invention will become more apparent in view of the following specification taken in conjunction with the accompanying drawings wherein:

FIG. 1 is a partial isometric perspective view of an automobile defrost nozzle incorporating the invention, FIG. 2 is an enlarged side perspective view of the mounting bar for securing the downstream end of the vibrating reed, FIG. 3 is an isometric perspective view of the oscillating reed of the present invention showing the weight attachment and the bend therein, and, FIG. 4 is a further embodiment of the invention.

Referring to FIG. 1 the duct or channel 10 of an automobile windshield defrost system is illustrated and it is connected to a source of defrost air (not shown) for defrost operation. The invention can be applied to other air supply systems such as heating and cooling systems for automobiles and can be beneficially applied with equal facility to air supply systems where it is desired to sweep the air back and forth as, for example, from a room air conditioner. The outlet nozzle 11 has a pair of spaced fairing walls 12-1 and 12-2 respctively joined by a pair of side walls 13, one of which is shown in FIG. 1. A vibrating reed oscillator element 15, described in greater detail in connection with FIG. 3, has the downstream thereof 16 secured in a mounting bar assembly 17 (described more fully in connection with FIG. 2) mounting bar 17 being secured to side walls 13. A curvature 18 or bend is provided in the body of the reed element 15 which stiffens the body of the element so that it generally flexes about an axis transverse to the direction of air flow and in this embodiment the air flow axis is de-noted generally by the line T. Any bending movement of the reed element 15 about any non-parallel axis such as its longitudal axis 1, is prevented by the bend 18. It will be appreciated that a series of transverse corrugations S as shown in FIG. 4 along the entire length of the body element 15 can achieve the same objective as the gentle curvature or bend 18, as well as a series of stiffener elements spaced along the entire operating length of the body 15 and spaced relatively short distances from one another can achieve the same objective which is to prevent cross or twist bending of the body of the reed element 15 and to limit the bending about the axis T or any axis parallel thereto.

The upstream end 20 has a weight 21 riveted thereto, the weight 21 having a slot 22 therein into which the upstream end 20 of vibrating reed element 15 is received and riveted therein or otherwisw secured. As shown in FIG. 3, in the preferred embodiment the reed element is constituted by spring steel. In an operating example, the spring steel was a number 301 spring steel fully hardened but it will be appreciated that most degrees of hardness of spring steel can be utilized to practice the invention. Fully hardened spring steel has a tensil strength of approximately 175,000 psi minimum and the extra hard spring steel 301 has a tensil strength of over 200,000 psi, both of which are useful in practicing the invention. Also, the weight 21 was 14 grams, having a width of 0.058 inches a thickness of 0.512 inches, and a width the same as the width of the reed element 15 namely 2.235 inches. The reed itself has a thichness of 0.005 inches. The bend 18 in the preferred embodiment was formed by rolling the body of the reed element 15 over a ½ inch cylinder. In the illustrated embodiment, the bend 18 has a radious of about 3 inches but this is not critical. What is important though is the twisting movements of the reed element be resisted so as to avoid bending of the body of the reed element about an axis other than those which are parallel to a secured downstream end 16 of reed element 15.

As is conventional in the manufacture of springs, the edges 31 and 32 of the reed element is polished to as eliminate notches burrs and the like and is secured in mounting bar assembly 17. Mounting assembly 17 is constituted by a pair of plates 17-1 and 17-2 which has a slot 25 or space therebetween, the opposing edges or corners 26 and 27 of the slot being rounded (a radius of at least ⅛ inch) so that there are no sharp edges against which the body of the reel element bears during the back and forth oscillatory movement. Thin rubber shims 17-S are positioned on each side of reed element 15 to serve as cushions. Rivets 28 are used to secure the end 16 of the reed element 15 in the mounting bar assembly 17 and the mounting bar assembly 17 is secured by screws, welding or releasable fasteners in the side walls 13 (only one shown) of the outlet element. The mounting bar can also be formed of plastic material, if desired.

With reference to FIG. 3, for use in sweeping the defrost air of a Pinto automobile (manufactured by the Ford Motor Company) a typical reed element was made of fully hardened 301 spring steel (175,000 psi) having a thickness of 0.005 inches a width of 2.235 inches and a length between the upper edge of the weight 21 and the lower edge of mounting bar assembly 17 of 2.457 inches. The weight 21 had the dimensions and weight given above.

While I have shown and described a preferred embodiment of my invention, it will be appreciated that various modifications and adaptations of my invention are possible and it is intended that such modifications and changes as would be obvious to those skilled in the art the emcompass by the spirit and scope of the claims appended hereto.

I claim:

1. A method of lengthening the life of an air operated oscillating reed resilient spring having the downstream end thereof tethered and the upstream end free to oscillate back and forth in a stream of air, which comprises forming a series of transverse corrugations spaced along the body of said resilient reed spring to avoid twist bending of the body of said resilient reed spring.

2. A method of silencing the oscillations of an air operated resilient reed spring having the downstream end thereof tethered and the upstream end free to oscillate back and forth in a stream of air, which comprises,
   forming a series of transverse corrugations spaced along the body of said reed to prevent twist bending of the body of said resilient reed.

* * * * *